United States Patent
Klopfenstein et al.

(10) Patent No.: US 6,985,190 B1
(45) Date of Patent: Jan. 10, 2006

(54) REAL-TIME SIGNAL STRENGTH DISPLAY OF TERRESTRIAL DIGITAL TELEVISION SIGNALS

(75) Inventors: Scott Edward Klopfenstein, Fishers, IN (US); Aaron Hal Dinwiddie, Cicero, IN (US); Daniel Richard Schneidewend, Fishers, IN (US)

(73) Assignee: Thomson Licensing, Boulogne-Billancourt (FR)

(*) Notice: Subject to any disclaimer, the term of this patent is extended or adjusted under 35 U.S.C. 154(b) by 536 days.

(21) Appl. No.: 10/009,298

(22) PCT Filed: Aug. 6, 2000

(86) PCT No.: PCT/US00/15760

§ 371 (c)(1),
(2), (4) Date: Dec. 4, 2001

(87) PCT Pub. No.: WO00/78039

PCT Pub. Date: Dec. 21, 2000

Related U.S. Application Data

(60) Provisional application No. 60/139,467, filed on Jun. 16, 1999, provisional application No. 60/143,341, filed on Jul. 12, 1999.

(51) Int. Cl.
*H04N 5/50* (2006.01)

(52) U.S. Cl. .............. 348/569; 348/570; 348/735; 348/732

(58) Field of Classification Search .............. 348/569, 348/570, 735, 732, 733, 731; 725/38, 40, 725/68, 72, 69; 455/154.1, 154.2, 159.1, 455/161.3; 343/760; 342/359
See application file for complete search history.

(56) References Cited

U.S. PATENT DOCUMENTS

| | | | | |
|---|---|---|---|---|
| 4,214,273 A | * | 7/1980 | Brown | 348/569 |
| 4,410,913 A | * | 10/1983 | Chin et al. | 348/570 |
| 4,605,968 A | * | 8/1986 | Hayashi | 725/72 |
| 5,283,653 A | * | 2/1994 | Citta | 348/725 |
| 5,422,681 A | | 6/1995 | Hayashi | 348/730 |
| 5,436,675 A | | 7/1995 | Hayashi et al. | 348/725 |
| 5,574,509 A | * | 11/1996 | Citta et al. | 348/569 |
| 5,940,028 A | | 8/1999 | Iwamura | |
| 5,966,186 A | * | 10/1999 | Shigihara et al. | 348/570 |
| 5,983,071 A | * | 11/1999 | Gagnon et al. | 725/72 |
| 6,216,266 B1 | * | 4/2001 | Eastman et al. | 725/72 |
| 6,314,565 B1 | * | 11/2001 | Kenner et al. | 717/171 |
| 6,389,070 B1 | * | 5/2002 | Cugnini et al. | 375/232 |

FOREIGN PATENT DOCUMENTS

| | | |
|---|---|---|
| EP | 0050328 | 4/1982 |
| EP | 0912051 | 4/1999 |
| WO | 99/04559 | 1/1999 |

* cited by examiner

*Primary Examiner*—Victor R. Kiostak
(74) *Attorney, Agent, or Firm*—Joseph S. Tripoli; Robert D. Shedd; Catherine A. Ferguson

(57) ABSTRACT

An HDTV receiver coupled to a terrestrial antenna displays real-time signal strength of terrestrial digital television signals. A graphical user interface preferably displays various data relating to all terrestrial television signals in a scrollable grid format. The grid is displayed within an active video display of a selected television signal from the grid. Audio for the selected channel is also active.

3 Claims, 4 Drawing Sheets

REAL-TIME SIGNAL STRENGTH DISPLAY OF TERRESTRIAL DIGITAL TELEVISION SIGNALS

CROSS-REFERENCE TO RELATED APPLICATIONS

This is a non-provisional patent application based on co-pending provisional patent application Ser. No. 60/139,467 filed Jun. 16, 1999, and co-pending provisional patent application Ser. No. 60/143,341, filed Jul. 12, 1999, which is hereby incorporated herein by reference, and which claims the benefit under 35 U.S.C. § 365 of International Application PCT/US00/15760, filed Jun. 8, 2000, which was published in accordance with PCT Article 21(2) on Dec. 21, 2000 in English.

BACKGROUND OF THE INVENTION

1. Field of the Invention

The present invention relates to digital television signals and, more particularly, to the receipt and measurement of off-air digital television signals.

2. Description of the Related Art

High Definition television (HDTV) sets and other digital digital set-top boxes must be able to receive digital signals, for example, terrestrial television signals. Terrestrial digital television signals will be received by the television set typically in addition to digital television signals from other sources. These other sources, such as cable and satellite (i.e., DBS), generally provide television signals at a standard signal strength that is sufficient to allow the television receiver to process and use the incoming digital television signal.

With both analog and digital off-air television signals, it is necessary to connect an antenna to the television set. If several digital channels are available, the user may be required to manually adjust the antenna in order to receive the best possible reception from all available channels. It is known to provide a channel search routine that will obtain a discrete sample or "snapshot" of all the currently available channels on the various antenna inputs. The channel search routine then stores the channels detected during the search in memory (e.g. EEPROM), deleting any channels previously stored that are not now currently available. At power-up of the unit, the channels in EEPROM become the channel list. If the user were to adjust or relocate the antenna, the signal strength of some digital signals (channels) may be too low to tune (or receive). Therefore at power-up or if the user runs a channel search, various channels may be deleted. Further, weak channels are removed to allow for the case where a user moves to another broadcast location (off-air, cable, or DBS).

It may be the case that several digital television signals are available to the user but only if the antenna is manually adjusted to achieve the best possible reception for the various channels. To efficiently achieve the best antenna placement, the user would need to know the signal strengths of the various digital television channels. Also, with the use of a rotor and control electronics, the best position for the antenna relative to each digital television channel could be obtained, stored, and utilized, if the signal strength of each digital television channel were known.

SUMMARY OF THE INVENTION

A dish pointing screen (an on-screen display or OSD) is currently used in Digital Broadcast Satellite (DBS) products which indicates the dish's orientation without concurrently displaying and/or reproducing the audio/video signal or displaying the signal strength of off-air digital television channels. In one aspect of the present invention, the currently tuned channel may be displayed, in the background and its respective entry will be highlighted. If a valid channel is not displayed, then the first channel in the list may be highlighted.

In accordance with one aspect of the present invention, there is provided a method and apparatus for displaying real-time signal strength of off-air digital television signals. An Antenna Information (Info) program/routine preferably utilizing a graphical user interface is adapted to compile a list of received channels, to display signal strength relating to any or all of the received digital channels in real-time, and to play the audio and video of any particular channel, for any antenna input. Since audio and video are active during the real-time display of signal strength, this allows the user to find the lowest signal strength that will provide an acceptable level of audio and video quality, i.e., a cut-off threshold. Finding the cut-off threshold is particularly useful when digital broadcasts come from different directions and the terrestrial antenna cannot be pointed in both directions.

In accordance with another aspect of the present invention, a user may switch to a different antenna input while the Antenna Information routine is active. Doing this will refresh the channel list to represent the available channels on the new antenna input. All of the channels obtained by a channel search over a period of time are retained in an Antenna Information List for use by the Antenna Information routine. Antenna Information can thus be a listing of every channel that has ever been added to a channel list by a channel search. For every channel in the channel list, the Antenna Information routine will try to get the tuner (or selector) to connect to a signal on the various channel frequencies. If the tuner is successful in receiving a usable television signal, the channel is retained in the channel list. If the television signal is digital, the strength of the signal will be at least measured, and possibly displayed.

The value of Antenna Info is to check the signal strength of digital channels while changing the antenna position. Antenna Info will usually include only the current antenna rather than both antennae simultaneously.

In accordance with an aspect of the present invention, the user has the ability to scroll through a list of channels that are currently in the channel list. When any specific channel is selected, the tuner will play audio and video for that channel, as the real-time signal strength is updated on-screen (digital channels only). The list of channels that are currently available includes both analog and digital channels in order to provide the user with an integrated channel screen where the effects of an antenna adjustment on both digital and analog channels may be easily seen.

BRIEF DESCRIPTION OF THE DRAWINGS

The invention will be better understood by reference to the following drawings, wherein.

Corresponding reference characters indicate corresponding parts throughout the several views.

DETAILED DESCRIPTION OF THE INVENTION

Figure 1:
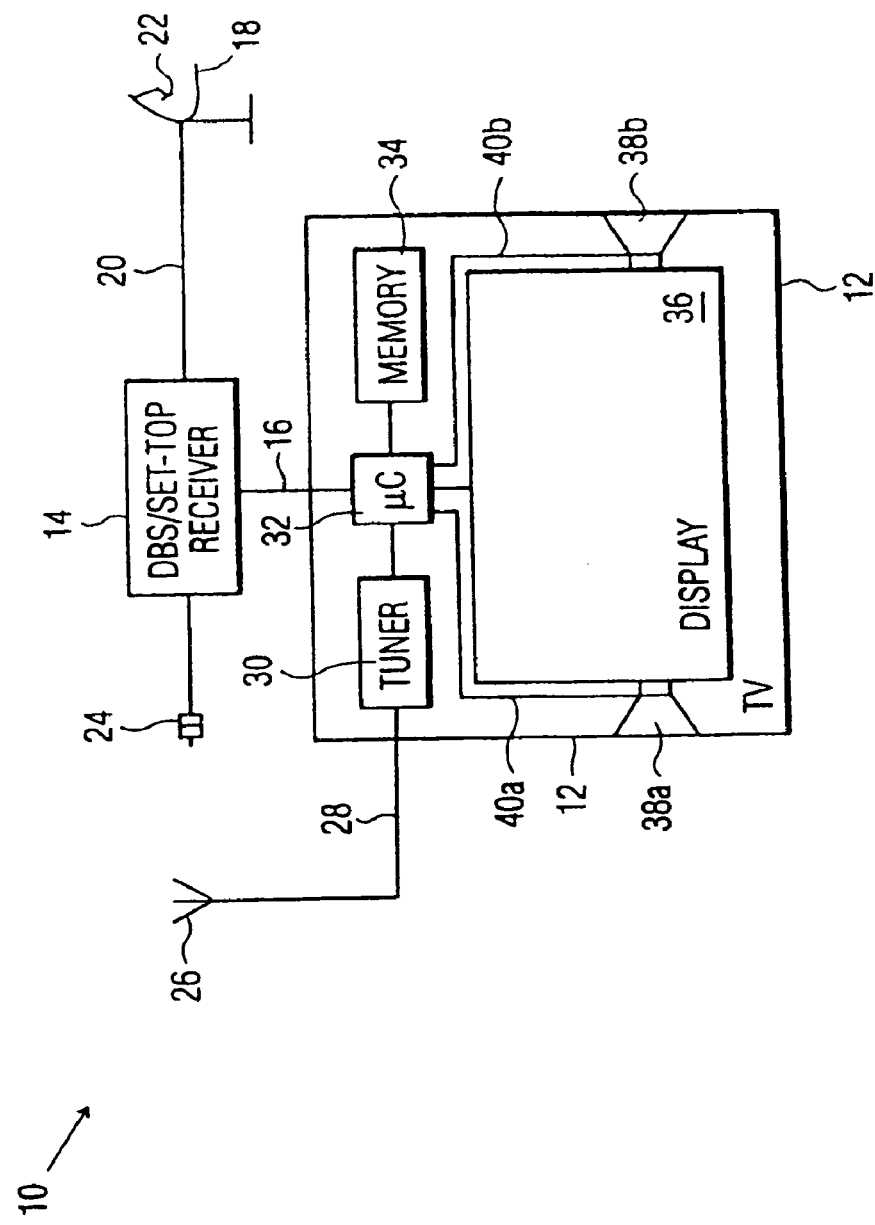
FIG. 1 depicts a multimedia system adapted to receive and utilize digital television signals.

Referring to FIG. 1, there is shown a simplified, functional block diagram of a multimedia system 10. Multimedia system 10 may include TV or monitor 12 and DBS and/or set-top box receiver 14, which is in communication with TV 12 via communication line 16 as is known in the art. DBS (Direct Broadcast Satellite) receiver 14 is in communication with dish (or antenna) 18 via communication line 20 as is known in the art. Dish 18 receives digital multimedia and/or data signals, e.g. television, music and/or internet signals (hereinafter collectively "television signals"), that are focused onto and received by feedhorn/LNA (Low Noise Amplifier) unit 22. Feedhorn/LNA unit 22 typically receives and slightly amplifies the received television signals and transmits the amplified television signals to DBS receiver 14 for processing. DBS unit 14 may also be coupled to a CATV or cable system (not shown) via cable input line 24. TV 12 may be coupled to antenna or aerial 26 via communication line 28. Antenna 26 is designed to receive off-air or non-satellite broadcast digital or analog television signals. As such, antenna 26 is generally adjustable either manually or automatically. The off-air television signals are fed into tuner 30 for discriminating or tuning the various channels and receiving any data signals as is known in the art.

Tuner 30 is in communication with microcontroller unit ("μC") 32 such that digital television signals received from antenna 26 are received and processed by microcontroller unit 32 as is known in the art. In addition to other functions as are known in the art, microcontroller unit 32 provides control and/or implementation of the various software programs/routines and is in communication with various components in accordance with the various aspects of the present invention. Microcontroller unit 32 is in communication with additional memory 34, e.g. EEPROM, RAM, ROM, and display 36. TV 12 may also include left and right speakers 38a and 38b, respectively, coupled to microcontroller unit 32 via audio communication lines 40a and 40b, respectively, for providing audio output for the user.

Additionally, microcontroller unit 32 includes the ability to generate, process, and display OSD information/data on display 36. The OSD information/data may be part of a received television signal or may be generated internally. Such OSD information may include channel number, time, signal strength, on-screen electronic program guides (EPGs), internet data, pop-up windows, on-screen electronic programming menus, and the like. Microcontroller unit 32 also runs various software necessary to process and/or utilize the incoming digital signals as is known in the art and additionally as provided herein.

It should be understood that microcontroller unit 32 by itself or along with tuner 30 and memory 34 form a module capable of implementing the present invention. This module may be totally separate (discrete module) or may incorporate existing constituents of the various components (virtual module). In this manner, the module may be incorporated into TV 12, DBS/Set-Top Receiver Unit 14, or any other digital component capable of receiving and/or utilizing digital television signals.

Figure 6:
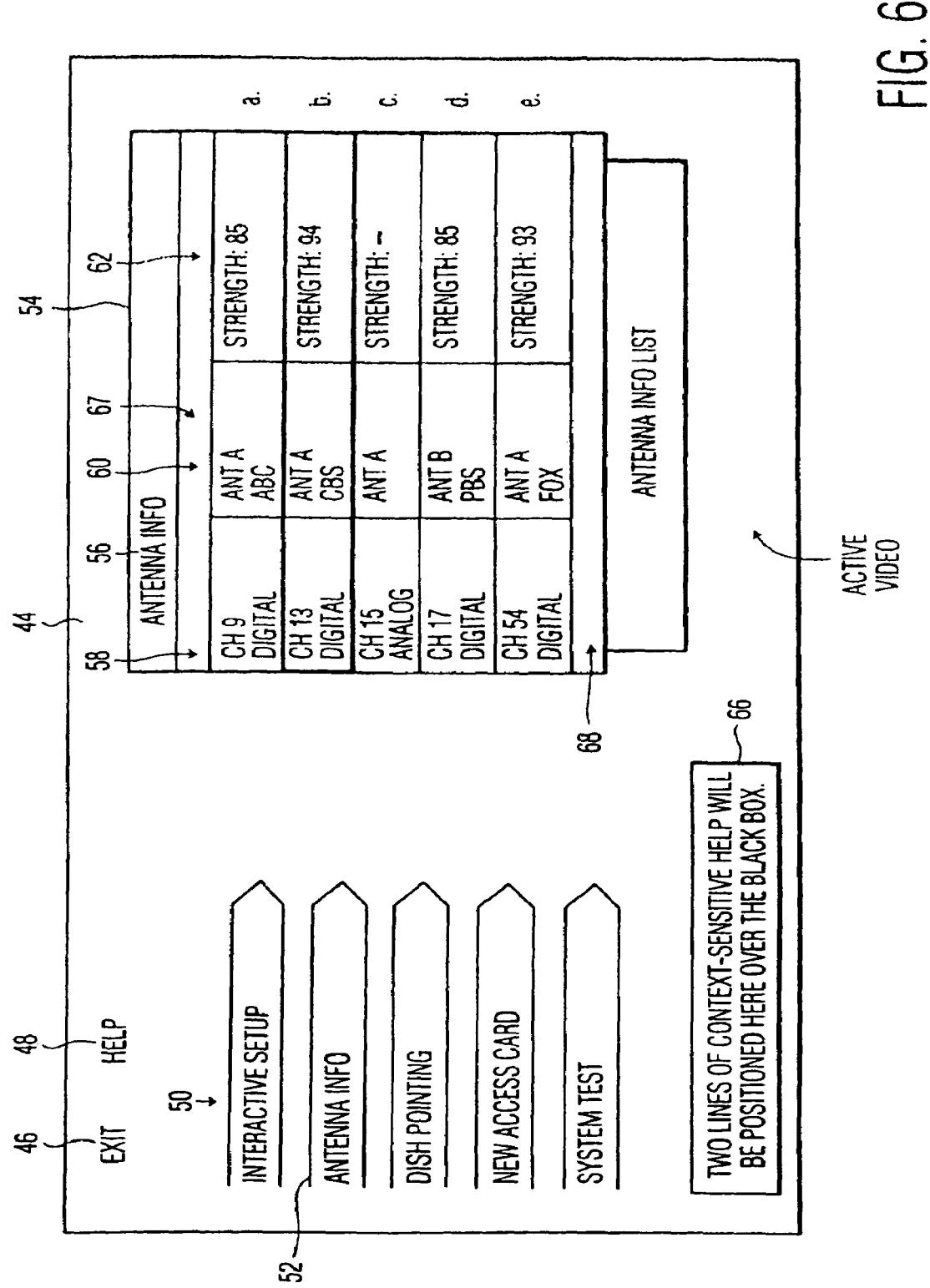
FIG. 6 is a depiction of a program screen as displayable on a display unit particularly showing Antenna Information Results in accordance with an aspect of the present invention.

Referring now to FIG. 6 there is depicted display 36 showing program screen 44. Program screen 44 is an exemplary screen indicative of a typical programming/menu/information ("program") screen into which the present invention may be incorporated. Included on program screen 44 is a plurality of menu items/programs/functions 50 available for possible selection by the user and implementation by the unit. In accordance with an aspect of the present invention, one such menu item 50 is "Antenna Info" (Antenna Information) 52.

Antenna Info 52 is a menu choice for invoking the Antenna Information program, function or routine from a main or auxiliary screen or through a separate button on a remote. Upon selection of Antenna Info either by button or menu choice, context sensitive textual help may be displayed on a portion of program screen 44 to assist the user.

The Antenna Information process provides real-time signal strength of the received digital signal (e.g., terrestrial or satellite television signals) and helps the user adjust his terrestrial antenna (e.g., antenna 26 of FIG. 1) to receive the greatest number of digital television channels that satisfy a minimum signal strength threshold. Therefore, the actual adding of both analog and digital channels to the current tuning capability of the television or set-top box and the building of a Channel List representative thereof, is done by the Channel Search function/routine. The search performed by Antenna Info may be separate from the Channel Search function and may be invoked from another program screen. When a signal or channel scan is performed by the Channel Search routine, only those analog and digital channels that have a signal strength above a certain threshold criterion is added to the Channel List which is stored in memory (e.g., EEPROM). The Channel List is thus a stored list of currently available analog and digital television channels that will be displayed during channel scanning/surfing by the user.

The actions performed by a Channel Search may be summarized by the following table, which identifies what occurs to the Channel List and

Figure 2:
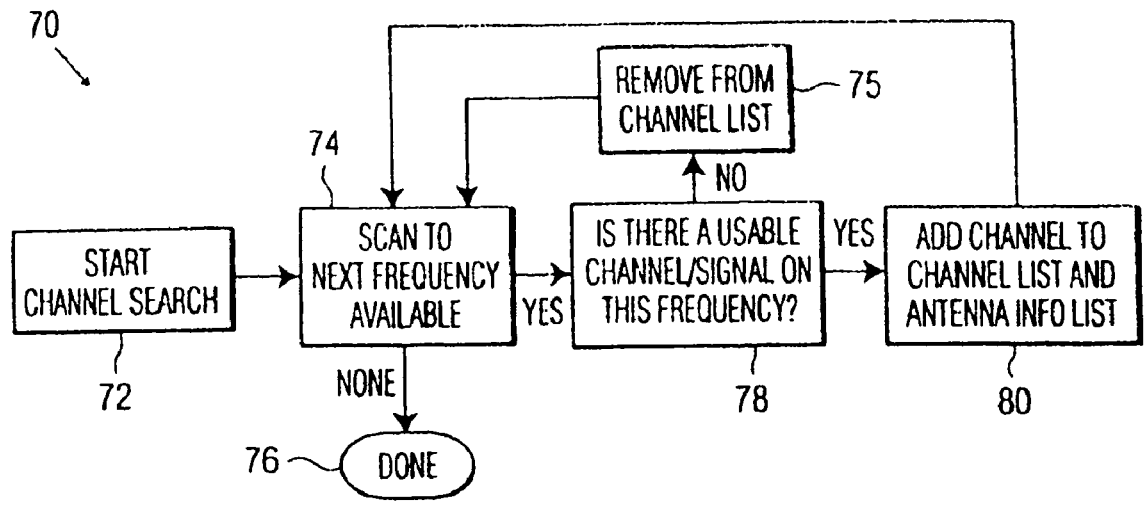
FIG. 2 is a program flow chart of a search routine invoked during a Channel Search in accordance with an aspect of the present invention.

| Action | Channel List | Antenna Info List |
|---|---|---|
| Find good channel | Add | Add |
| Find bad channel | Remove | No-Change | the Antenna Info List which is stored separately from the Channel List and utilized for a different purpose during a Channel Search. With additional reference to FIG. 2, there is depicted program flow chart 70 for the Channel Search routine. Upon selection, the Channel Search is started 72 and the next frequency starting from a chosen frequency is scanned 74. If there is not a next frequency, the routine is done 76. When a next frequency is encountered, it is determined whether there is a usable signal on the frequency/channel 78. Usable may be determined by applying a threshold signal strength for the incoming signal to overcome or other parameter or set of parameters. For each incoming frequency/channel that does not meet threshold signal strength requirements or otherwise, the channel is removed from the Channel List 75 and a next frequency is determined 74. A continuous non-receipt of usable channels results in a loop until there are no more next frequencies available. For each incoming frequency/channel that meets the threshold signal strength requirements or otherwise, the channel is added to the Channel List and the Antenna Info List in step 80. The process repeats until there is no next frequency as determined in step 74.

Figure 3:
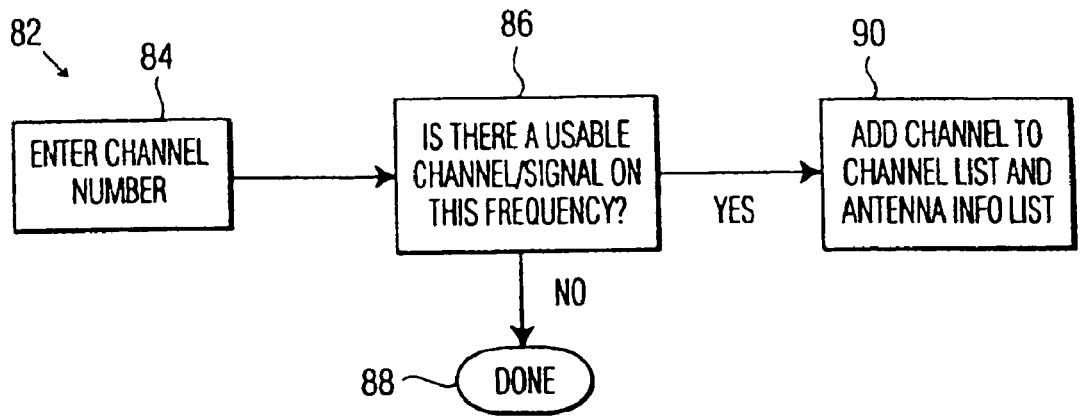
FIG. 3 is a program flow chart of a search routine that adds a channel to the Channel List and Antenna Info List as a result of a discrete digital entry, in accordance with an aspect of the present invention.

With reference to FIG. 3 there is depicted a program flow chart 82 for automatically adding channels to the Channel List. When a user inputs discrete digits for a particular channel 84, generally from a keypad of a remote (not shown), the program begins. Upon receipt of the channel number, it is determined whether there is a usable signal on the frequency/channel 86. If there is no usable signal, the program terminates 88. If there is a usable signal that channel is added to the Channel List and the Antenna Info List 90.

Figure 4:
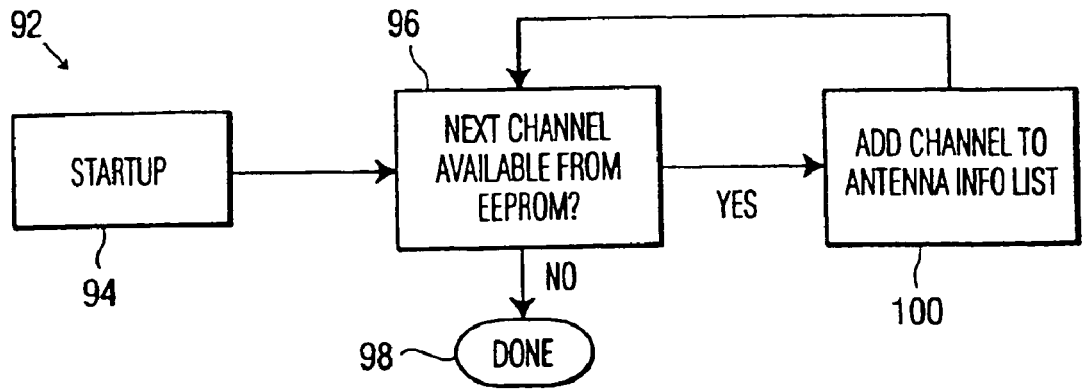
FIG. 4 is a program flow chart of a power-up routine in accordance with an aspect of the present invention.

With reference to FIG. 4 there is depicted a program flow chart 92 for adding channels to the Antenna Info List, generally unbeknownst to the user. When the power to the unit is turned on at step 94 the next channel that is in EEPROM is scanned to determine if there is an available signal 96. If not, the program terminates 98. If a usable signal exists (is available), it is added to the Antenna Info List 100. Thereafter the program determines if another channel is available for viewing. These routines thus add usable channels to the Channel List as well as the Antenna Info List.

The actions performed by an Antenna Info search may be summarized by the following table which, identifies what occurs during an Antenna Info search when a good strength signal is received (usable) or a bad strength signal is received (low or none).

| Action | Channel List | Antenna Info List |
|---|---|---|
| Find good channel | Add | Update Signal Strength |
| Find bad channel | No Change | Update Signal Strength |

Figure 5:
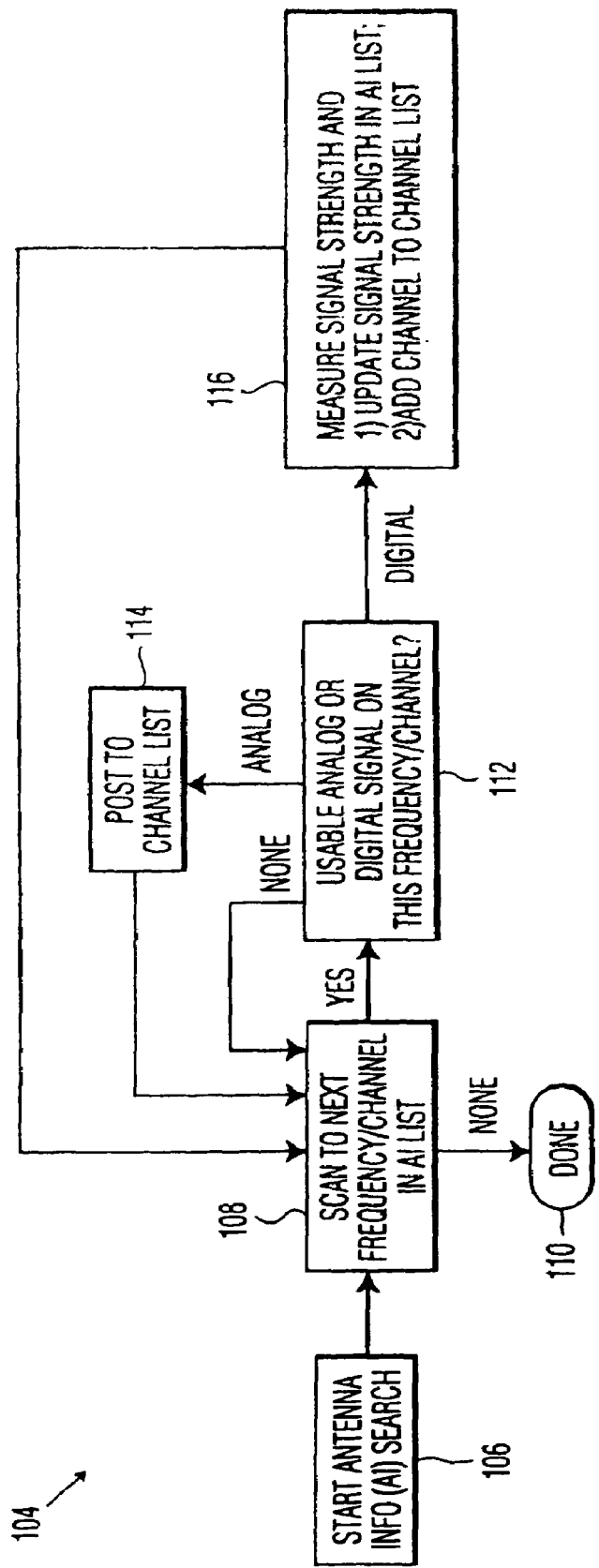
FIG. 5 is a program flow chart of a search routine invoked during an Antenna Info search in accordance with an aspect of the present invention.

FIG. 5 is a flow chart of the Antenna Info Search routine 104. Upon start of the Antenna Info search 106, the next frequency/channel in the Antenna Info List is scanned for a signal 108. If there are no more frequencies/channels and/or it is the end of a predetermined list, the program terminates 110. If a usable signal exists on the channel it is determined whether it is an analog or digital signal 112. An analog signal is added (posted) to the Channel List 114. Thereafter, the unit is ready to scan to the next frequency 108. If the signal is digital, the signal strength is measured in real-time and is updated in the Antenna Info List, and the channel is added to the Channel List 116. Thereafter, the unit is ready to scan to the next frequency 108.

At the same time the various Antenna Info screens are prompting the user, channel data grid 54 will fill with information about the channels, one per row 64, that are being received or have been received from all terrestrial antenna(s), namely, the channel number, column 58; the station name (e.g., NBC [if possible] in column 60); whether the channel is digital or analog, column 58; which antenna is picking up the channel, column 60, and for the digital channels only, their current signal strength, column 62. Other types of information may also be displayed regarding the various channels. Channel data grid 54 includes screen name 56 (Antenna Info) and displays a number of rows, here five rows 64*a–e*, at one time. Arrows 67 and 68 indicate there are more channels viewable through scrolling up or down the grid.

The Antenna Info screen will retain those channels that were previously measured in a past Antenna Info measurement process but aren't of sufficient strength to pass the "signal-strength threshold criterion/level" to be added to a channel list from a Channel Search. This is desirable since users may not know what local channels are available, but once they know which channels are available, it is up to the discretion of the user whether to try and adjust their antenna(s) to make certain channels have sufficient strength to be added to a Channel Search list.

Once the signal strength measurement is complete, the Antenna Info Results Screen shown in program screen 44 will be shown on display 36. The user can navigate through the grid defined by the channel number and their various attributes or characteristics (rows 64 and columns 58, 60, 62) by scrolling up and down the looping/wrap-around list to see what channels are available using the current antenna position. Those digital channels with, for example, a "-" instead of a number indicate that the signal strength is neither sufficient for viewing the channel nor for adding the channel to a Channel List from a Channel Search, see 64*d*. All analog channels will have "N/A" appear as their strength to indicate that signal strength measurement is not available for those channels (see 64*c*). Those channels that are currently unavailable through a Channel Search can appear in the list from previous signal strength measurements or appear in the list from information obtained from a guide or as otherwise indicated herein.

If the user selects the "Antenna Info" function, then the signal strength for that channel will be measured and/or updated. As the user scrolls through different channels, the tuner tries to connect to the channel that is highlighted. If the channel is detected, the signal strength measurement is taken and/or updated. At no time are channels automatically discarded for insufficient signal strength, this helps the user to know what channels are available and to try and adjust the antenna(s) to make channels have sufficient signal strength to be added to the channel list.

The list may be sorted from lowest channel number at the top to highest channel number at the bottom. For channels where an analog and a digital channel share the same virtual channel number, the analog channel appears adjacent to the digital channel in the list.

The user can update the information for each channel simply by moving the highlight to that channel in the Antenna Info screen (see 64*b*). In addition, the video behind the Antenna Info display area will show the current channel, including audio, to assist the user in making antenna adjustments. To change antennas or antenna input, the user presses ANTENNA on the remote or by menu choice. Each time a full Antenna Info Search is performed the signal strengths for all digital channels will be measured. Each highlighted channel in the grid has its signal strength updated in real-time as the audio and video for that channel are being played behind program screen 44 on display 36. In an alternative embodiment the signal strength of each available channel is not automatically displayed. The signal strength will be displayed upon selection of the channel.

When the signal strength measurement process is complete, a dialog box will appear on display 36, typically superimposed or within the current screen. When the user selects "Continue", the highlight in the Antenna Info screen will move to the first channel row (64*a*) in channel data grid 54. If the user aborts the signal measurement process, a dialog box is displayed informing the user and the displayed strengths in channel data grid 54 are whatever was determined until the moment that the process was aborted.

When the channel in the list is highlighted (64b), the information about the channel is continually updated. This is particularly useful in the case where a digital channel that is transmitting a Program and System Information Protocol (PSIP) (ATSC document A/65) guide changes the channel lineup to include an analog channel with the same major channel number (briefly define major channel) as the digital channel. In this case, the Antenna Info list will expand to include this new analog channel as a separate entry (row 64) in channel data grid 54. The new analog channel will have the same channel number as the digital channel, but will be marked as an analog channel in column 58, as opposed to being marked a digital channel. This update and expansion of the list is totally automatic and in real-time.

In order to align the terrestrial antenna to obtain the best signal strength for a given set of digital channels, it will be most likely necessary to perform an Antenna Info Search several times for each terrestrial antenna receiving digital television signals. Signal strengths for the various digital television channels will need to be monitored with relation to the orientation of the antenna while the antenna is being positioned. By performing the Antenna Info Search many times, an optimum antenna position may be found. After the antenna has been positioned accordingly, it is necessary to perform a Channel Search to add the channels to the Channel List.

An example will illustrate the above principles. A new terrestrial antenna (ref. antenna 26, FIG. 1) adapted to receive off-air digital television signals, is coupled to a receiving unit (ref. TV 12, FIG. 1). Assume that after power-up the initial state of both the Channel List and the Antenna Info List are empty. A Channel Search is run by the user during initial setup of the unit or because several new channels have been added after a previous Channel Search. The initial Channel Search locates two channels having signals above a given threshold level for minimal reception, namely channels "10" and "20." At this point, Channel List contains channels "10" and "20", and the Antenna Info List contains channels "10" and "20." The user then adjusts antenna 26 and performs another Channel Search. This search locates two additional channels having signals above a given threshold level for minimal reception, namely channels "30" and "40", but did not detect previous channels "10" and "20" because of the new antenna orientation. Now, Channel List contains channels "30" and "40", while Antenna Info List contains channels "10", "20", "30", and "40." Since the user knows there are four channels available, an Antenna Info Search is run each time the position of the antenna is altered slightly to try to determine an optimal position of the antenna. Channel "10" will be checked in accordance with the program flow chart of FIG. 5. Assume that now channel "10" has a signal strength greater than the predetermined threshold. Therefore, channel "10" is added to Channel List making the contents of Channel List channels "10", "30", and "40", while the Antenna Info List does not change. Another adjustment to the antenna and another Antenna Info Search is performed. Assume that now channel "20" now has a signal strength greater than the predetermined threshold. Channel "20" is added to Channel List making the contents of both Channel List and Antenna Info List channels "10", "20", "30", and "40."

While this invention has been described as having a preferred design, the present invention can be further modified within the scope of this disclosure. This application is therefore intended to cover any variations, uses, of adaptations of the invention using its general principles. Further, this application is intended to cover such departures from the present disclosure as come within known or customary practice in the art.

What is claimed is:

1. A video processing apparatus, for receiving terrestrial analog and digital television signals and for generating an output signal suitable for coupling to a display device for producing a displayable image, the apparatus comprising:
   means for selecting a television signal from a plurality of received television signals;
   control means for controlling said video processing apparatus; and
   means for determining the signal strength of said received television signals, wherein
   said control means causes said video processing apparatus to operate in one of a first mode of operation during which said selected television signal is included in said output signal for display in said displayed image; and
   a second mode of operation during which said signal strength of said received television signals is provided for display on said display device concurrently with said selected television signal.

2. The video processing apparatus of claim 1, wherein said means for determining signal strength includes means for updating said signal strength of said selected television signal and said second mode of operation includes showing the update of signal strength.

3. The video processing apparatus of claim 2, wherein said means for updating includes means for determining whether a television signal is digital or analog, and said second mode of operation includes means for displaying whether said television signal is digital or analog.

* * * * *